United States Patent [19]

Arakawa et al.

[11] Patent Number: 5,213,852
[45] Date of Patent: May 25, 1993

[54] PHASE DIFFERENCE FILM AND LIQUID CRYSTAL DISPLAY HAVING THE SAME

[75] Inventors: Kohei Arakawa; Sumio Ohtani, both of Kanagawa, Japan

[73] Assignee: Fuji Photo Film Co., Ltd., Kanagawa, Japan

[21] Appl. No.: 795,543

[22] Filed: Nov. 21, 1991

[30] Foreign Application Priority Data

Nov. 21, 1990 [JP] Japan .................................. 2-316440

[51] Int. Cl.$^5$ ............................................ G02F 1/1335
[52] U.S. Cl. ........................................ 428/1; 428/522; 428/910; 359/73
[58] Field of Search .......................... 428/1, 522, 910; 359/73

[56] References Cited

U.S. PATENT DOCUMENTS 3,862,880  1/1975  Feldman .............................. 428/910

Primary Examiner—Alexander S. Thomas
Attorney, Agent, or Firm—Sughrue, Mion, Zinn, Macpeak & Seas

[57] ABSTRACT

Disclosed is a phase difference film in the form of a uniaxially stretched film having a negative intrinsic birefringence which is made of a styrene/acrylonitrile copolymer. The copolymer has a styrene unit and an acrylonitrile unit in the range of 85/15 to 50/50 by weight (former/latter) and a weight-average molecular weight in the range of 200,000 to 900,000. The liquid crystal display provided with the phase difference film is also disclosed.

4 Claims, 2 Drawing Sheets

PHASE DIFFERENCE FILM AND LIQUID CRYSTAL DISPLAY HAVING THE SAME

BACKGROUND OF THE INVENTION

1. Field of the Invention

The present invention relates to a phase difference film employable for a liquid crystal display, and a liquid crystal display provided with the phase difference film.

2. Description of Prior Art

A super twisted nematic liquid crystal display (hereinafter referred to as STN-LCD) has been recently utilized for dot-matrix type liquid crystal displays such as a word processor and a personal computer. The liquid crystal display has generally a structure that a liquid crystal cell is disposed between a pair of polarizing sheets. The STN-LCD uses a super twisted nematic liquid crystal showing a twisted angle of not less than 160 degrees. Such STN-LCD has an advantage of showing a high contrast on high multiplexing drive compared with the conventional twisted nematic liquid crystal display which can be utilized for the dot-matrix type liquid crystal displays.

A display screen of the STN-LCD shows an image inherently colored with the hue from green to yellowish red owing to elliptically polarized light transmitted through STN liquid crystal cell. This phenomenon may be hereinafter referred to as coloring. In order to avoid the coloring of the display screen, there is adopted a countermeasure of elimination of the coloring by changing the elliptically polarized light into linearly polarized light, which is accomplished by compensating a phase difference caused by birefringence of the STN liquid crystal. For example, there have been proposed a liquid crystal display using an additional liquid crystal cell which serves as an optically anisotropic body (that is, NTN mode-display) and a liquid crystal display using a uniaxial stretched polymer film (that is, FTN mode-display). The FTN mode-display utilizes a uniaxial stretched polymer film serving as optically anisotropic body instead of the liquid crystal cell. The former NTN mode-display shows excellent characteristics in black-and-white display. The liquid crystal cell for optically anisotropic body used in the NTN mode-display use is voluminous and a plurality of such cells are required, so that the NTN mode-display is larger in volume and weight, and higher in production cost than the FTN mode-display.

Japanese Patent Provisional Publication No. 63(1988) 189804 proposes, as a uniaxial stretched film for the FTN mode, use of a polycarbonate film which is uniaxially stretched so that a value of retardation measured by a polarizing microscope is set in the range of 200 to 350 nm or 475 to 625 nm. The retardation is defined by the product of birefringence ($\Delta n$) and thickness (d) of the film.

Japanese Patent Provisional Publication No. 63(1988). 167304 discloses a laminated film in which two or more uniaxial stretched films having birefringence are so laminated as to allow their main optic axes to intersect at right angles each other. In the case that two birefringence films (their retardation values are named $R_1$ and $R_2$, respectively) are laminated under the intersection at right angles, the retardation of the composite film (i.e., phase difference film) shows a retardation value of "$|R_1 - R_2|$". Such film can be adjusted so that the value of the "$|R_1 - R_2|$" is set in the range of 90 to 180 nm, 200 to 350 nm or 475 to 625 nm. Thus, the composite film prevents the display screen from coloring.

The above polymer films (phase difference films) have been developed for the purpose of the elimination of coloring of the STN-LCD. Thus, the coloring is reduced and the display provided with the film shows almost a black-and-white image. Further, the liquid crystal display utilizing the FTN mode has the advantages of lightweight and low production cost compared with the NTN mode-display as mentioned previously.

As described above, the above liquid crystal display has been improved in elimination of coloring, so far as the coloring view from the direction vertical to the screen is concerned. However, when the liquid crystal display is viewed from an oblique direction, unfavorable viewing angle characteristics such as coloring and disappearance of displayed image are observed.

In order to improve the viewing angle characteristics, various phase difference films have been proposed. Their improvements are proposed from the viewpoint of changing refractive indices in three-dimension directions of the film. For instance, Japanese Patent Provisional Publication No. 2(1990).189518 discloses a phase difference film in which "$n_{MD}$" is less than both $n_{TD}$ and $n_{ND}$ (i.e., phase difference film having a negative uniaxiality), wherein "$n_{MD}$" is a refractive index in a stretched axis direction of uniaxially stretched polymer film (phase difference film), "$n_{TD}$" is a refractive index in a direction intersected at right angles to the stretched axis of the film and "$n_{ND}$" is a refractive index in a normal line direction to the surface of the film. The directions of these symbols are illustrated in FIG. 3 of the attached drawings.

Japanese Patent Provisional Publication No. 2(1990)-256023 discloses a phase difference film as described below. The film is a laminated film comprising a film A and a film B. The film A is at least one film having light transmission properties and at least one optic axis at an angle of not less than 45 degree to a normal line direction of the surface of the film, or satisfying the following formula:

$$n_{ND} - (n_{MD} + n_{TD})/2 > 0$$

wherein $n_{ND}$, $n_{MD}$ and $n_{TD}$ mean the above definitions. And the film B is at least one uniaxially stretched film of a polymer having a positive intrinsic birefringence and light transmission properties. The film A is, for example, a biaxially stretched (orientated) polystyrene or polyacrylate film having a negative intrinsic birefringence.

The above techniques using the phase difference film having a negative intrinsic birefringence are reasonable for enhancement of viewing angle characteristics. However, the film having a negative intrinsic birefringence is not satisfactory in productivity, yield and stability of retardation value during storage at high temperatures. In more detail, it is generally needed that the material (polymer) of the phase difference film satisfies the characteristics such as transparency, easiness of occurrence of birefringence by stretching, and sufficient flexibility and heat resistance so as not to damage the film in the procedures for its production such as film formation, stretching, transportation and winding.

Studies of the present inventors have revealed that among known phase difference films having a negative intrinsic birefringence a polystyrene film only has practical value in easiness of occurrence of birefringence. However, a phase difference film made of the polystyrene dose not exhibit a satisfactory heat-resistance and a good flexibility, so that the film is apt to be damaged in the process for the preparation.

SUMMARY OF THE INVENTION

It is an object of the present invention to provide a novel phase difference film greatly improved in physical properties such as heat-resistance and flexibility, and viewing angle characteristics for a liquid crystal display.

It is another object of the present invention to provide a liquid crystal display provided with a phase difference film which is greatly improved in physical properties such as heat-resistance and flexibility, and viewing angle characteristics.

There is provided by the invention a phase difference film in the form of a uniaxially stretched film made of a copolymer having a negative intrinsic birefringence, said copolymer comprising a styrene unit and an acrylonitrile unit in the range of 85/15 to 50/50 by weight (former/latter) and having a weight-average molecular weight in the range of 200,000 to 900,000.

Preferred embodiments of the phase difference film of the present invention are as follows:

1) The phase difference film wherein the copolymer has a weight-average molecular weight in the range of 250,000 to 800,000.

2) The phase difference film wherein the copolymer has a the absolute value of a negative intrinsic birefringence of not less than 0.02.

3) The phase difference film wherein the copolymer has a styrene unit and an acrylonitrile unit in the range of 75/25 to 60/40 by weight.

4) The phase difference film wherein the copolymer has a styrene unit and an acrylonitrile unit in the range of 70/30 to 60/40 by weight.

5) The phase difference film wherein the styrene/acrylonitrile copolymer is a polymer produced by emulsion polymerization or suspension polymerization.

There is further provided by the invention a liquid crystal display which comprises a liquid crystal cell comprising a pair of substrates provided with a transparent electrode and a twist-orientated nematic liquid crystal sealed therebetween, at least one phase difference film provided on at least one of the substrates and a pair of polarizing sheets arranged on the both sides of the cell said phase difference film comprises at least one uniaxially stretched film of a polymer having a positive intrinsic birefringence and at least one uniaxially stretched film of a copolymer having a negative intrinsic birefringence, said copolymer comprising a styrene unit and an acrylonitrile unit in the range of 85/15 to 50/50 by weight and having a weight-average molecular weight in the range of 200,000 to 900,000.

Preferred embodiments of the liquid crystal display of the present invention are as follows:

1) The liquid crystal display wherein the copolymer has a weight-average molecular weight in the range of 250,000 to 800,000.

2) The liquid crystal display wherein the copolymer has a styrene unit and an acrylonitrile unit in the range of 75/25 to 60/40 by weight.

3) The liquid crystal display wherein the copolymer has a styrene unit and an acrylonitrile unit in the range of 70/30 to 60/40 by weight.

4) The liquid crystal display wherein the phase difference film is a laminated film comprising a uniaxially stretched film of a polymer having a positive intrinsic birefringence and a uniaxially stretched film of a copolymer having a negative intrinsic birefringence, and the stretched axes of the two films intersect at almost right angles each other.

5) The liquid crystal display wherein the liquid crystal is a twisted nematic crystal liquid or cholesteric liquid crystal.

6) The liquid crystal display wherein the absolute value of the positive intrinsic birefringence and that of the negative intrinsic birefringence each is not less than 0.02.

The uniaxially stretched film of a styrene/acrylonitrile copolymer having a specific composition according to the invention has birefringence, excellent heat-resistance and good flexibility, so that the film is enhanced satisfactorily in productivity, yield and stability of retardation value during storage and further is excellent in characteristics needed for a phase difference film such as less coloring and good viewing angle characteristics.

The liquid crystal display of the invention has a structure that the laminated film comprising the above uniaxially stretched film of styrene/acrylonitrile copolymer and the uniaxially stretched film of a polymer having a positive intrinsic birefringence is arranged between a polarizing sheet and a liquid crystal cell. Such liquid crystal display shows a distinct black-and-white image and further is improved in viewing angle characteristics, i.e., coloring or disappearance of display with a slight change of viewing angle. Furthermore, the display has an excellent durability because of good heat-resistance of the phase difference film of the invention.

DETAILED DESCRIPTION OF THE INVENTION

Figure 1:
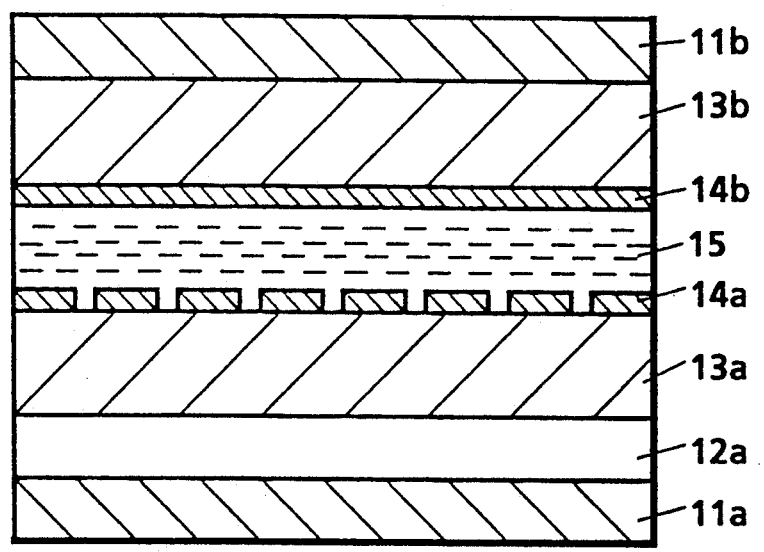
FIG. 1 is a sectional view of one embodiment of the liquid crystal display according to the invention.
Figure 2:
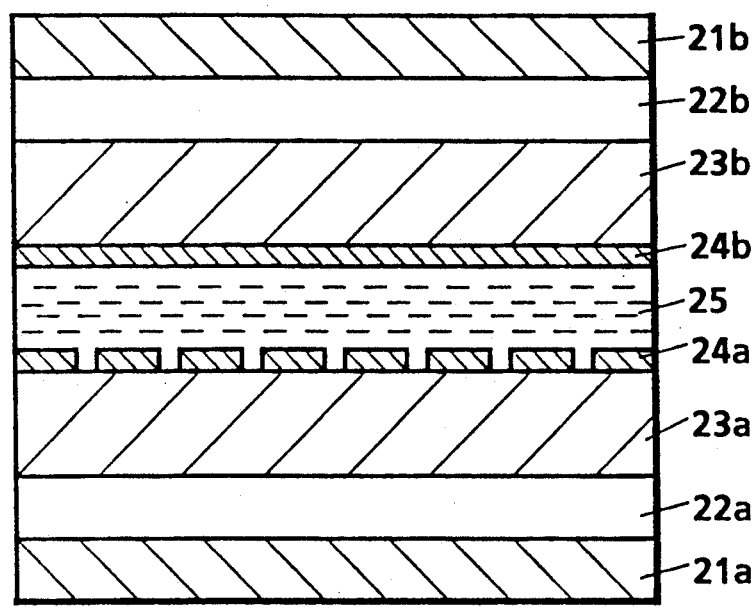
FIG. 2 is a sectional view of another embodiment of the liquid crystal display according to the invention.
Figure 3:
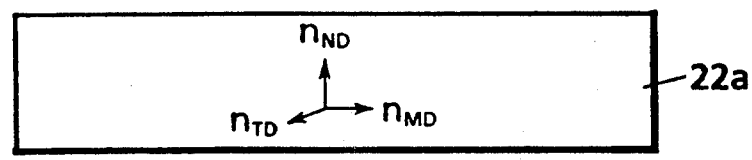
FIG. 3 is a sectional view schematically showing three dimensional directions of a uniaxially stretched film.

The liquid crystal display is described in more detail referring to the attached FIGS. 1 to 3.

FIG. 1 is a sectional view of one embodiment of the liquid crystal display of the invention. Transparent substrates 13a, 13b and transparent electrodes 14a, 14b are superposed, respectively, and the electrodes 14a, 14b are arranged facing each other, between which a twisted nematic liquid crystal 15 is sealed. In this manner, a liquid crystal cell is constructed. The phase difference film 12a is provided on the substrate 13a of the liquid crystal cell and polarizing plates 11a, 11b are arranged on the both sides (on the phase difference film 12a and the substrate 13b) of the liquid crystal cell, to constitute the liquid crystal display. The phase difference film may be also provided between the polarizing plate 11b and the substrate 13b. The phase difference film of the invention comprises at least one uniaxially stretched film of a polymer having a positive intrinsic birefringence and at least one uniaxially stretched film of a copolymer having a negative intrinsic birefringence. Further, the copolymer of a negative intrinsic birefringence is made of a styrene/acrylonitrile copolymer having the above specific composition and a weight-average molecular weight in the range of 200,000 to 900,000. The phase difference film preferably is a laminated film in which these two films are laminated and the stretched axes of the two films preferably intersect at almost right angles each other. The phase difference film is generally arranged in such a manner that the polymer having a positive intrinsic birefringence is located on the crystal liquid cell side.

FIG. 2 is a sectional view of another embodiment of the liquid crystal display of the invention. Transparent substrates 23a, 23b and transparent electrodes 24a, 24b are superposed, respectively, and the electrodes 24a, 24b are arranged facing each other between which a nematic liquid crystal 25 is sealed, whereby a liquid crystal cell is constructed. On the substrates 23a, 23b of both sides of the liquid crystal cell, phase difference films 22a, 22b and polarizing plates 21a, 21b are provided, respectively, to constitute the liquid crystal display. The phase difference film 22a is a uniaxially stretched film of a polymer having a positive intrinsic birefringence and the phase difference film 22b is a uniaxially stretched film of a copolymer having a negative intrinsic birefringence. The polymer of a negative intrinsic birefringence is made of the styrene/acrylonitrile copolymer having the above specific composition and a weight-average molecular weight in the range of 200,000 to 900,000.

As described above, the present invention employs, as a phase difference film, a film consisting of a uniaxially stretched film of a polymer having a positive intrinsic birefringence and a uniaxially stretched film of a copolymer having a negative intrinsic birefringence. Why such structure is adopted in the invention is described below referring to the attached FIG. 3.

A conventional phase difference film generally employs a polymer having a positive intrinsic birefringence. In FIG. 3, "$n_{MD}$" is a refractive index in a stretched axis direction of a uniaxially stretched film made of a polymer having a positive intrinsic birefringence, "$n_{TD}$" is a refractive index in a direction intersected at right angles to the stretched axis of the film and "$n_{ND}$" is a refractive index in a normal line direction to the surface of the film. These refractive indices is adjusted under the condition of "$n_{MD} > n_{TD} \geq n_{ND}$". Hence, in the case that a light is incident perpendicular to the surface of the film, Re (retardation) is represented by the following formula:

$$Re = (n_{MD} - n_{TD})d$$

wherein "d" is a thickness of the film. In the case that a light is incident intersected at right angles to the stretched direction of the film, a birefringence varies between "$\Delta n = n_{MD} - n_{TD}$" and "$\Delta n = n_{MD} \ n_{ND}$" with variation of incident angles, where the relationship of "$n_{MD} - n_{TD} \leq n_{MD} - n_{ND}$" is satisfied. Therefore, $\Delta n$ tends to increase (or not to change) with variation of the angles of oblique incidence. On the other hand, an optical path becomes larger due to the oblique incidence, so that "Re (=$\Delta nd$)" also rapidly increases with increase of the angle of the oblique incidence. Further, in the case that a light is incident with tilting to a normal line direction of the film to the stretched direction, $\Delta n$ decreases rapidly from "$n_{MD} - n_{TD}$" to "$n_{ND} - n_{TD}$" so that even increase of an optical path can not compensate decrease of the $\Delta n$, whereby "Re (=$\Delta nd$)" is rapidly decreased with increase of the angle of the oblique incidence. In even uniaxially stretched film which is in principle considered that variation of the retardation (Re) is the least (i.e., in the case of "$n_{MD} > n_{TD} = n_{ND}$"), the Re varies greatly with increase of optical path accompanied by the oblique incidence.

In the phase difference film according to the present invention, for example, a composite film formed by laminating a uniaxially stretched film of a polymer having a positive intrinsic birefringence on a uniaxially stretched film of a copolymer having a negative intrinsic birefringence, variation of the retardation in all directions of oblique incidence on the composite film can be freely controlled so that the sum of retardations of the uniaxially stretched films in the normal line direction is not compensated each other. Therefore, optional films such as a film which is extremely small in variation of the retardation in all the directions of the oblique incidence and a film having appropriate retardations can be easily produced. The above effect is advantageously obtained in the case that the uniaxially stretched film of a polymer having a positive intrinsic birefringence and the uniaxially stretched film of a copolymer having a negative intrinsic birefringence are used for lamination so that the stretched axes of the two films intersect at almost right angles each other.

In the above composite film, it is possible to make dependence on viewing angle of the retardation as little as possible by controlling molecular orientation of each uniaxially stretched film through change of stretching conditions, or to make the dependence to appropriately change in the similar manner. Hence, the viewing angle characteristics of the composite film can be suited to any optical characteristics of STN-LCD. Further, the liquid crystal display (STN-LCD), in which the composite film is interposed between a polarizing sheet and a liquid crystal cell, is greatly improved in viewing angle characteristics.

In this way, the liquid crystal display of the invention enables improvement of viewing angle characteristics and enlargement of high contrast area as well as elimination of coloring caused by birefringence of a liquid crystal cell using a twisted nematic liquid crystal with the twisted angles of not less than 90 degree, particularly in the range of 180 to 330 degrees and a liquid crystal cell using a cholestric liquid crystal.

Retardation in a normal line direction of the composite film (laminated film) is expressed by the sum of retardation of the uniaxially stretched film of a copolymer having a negative intrinsic birefringence and that of the uniaxially stretched film of a polymer having a positive intrinsic birefringence. However, it is not preferred that the stretched axis of the above polymer having positive intrinsic birefringence and that of the copolymer having negative intrinsic birefringences are coincident with each other, because the obtained retardation disappears by compensation of their retardations. Accordingly, the axes of the films constituting the composite film are preferably intersected at almost right angles. The intersected angle of the axes is particularly preferred in the range of 70 degrees to 110 degrees. However, in the case that the two films having negative and positive intrinsic birefringences are arranged on both sides of the liquid crystal cell (see FIG. 2), the angle of the axes may be not restricted as above.

Further, the film or the composite film may have function of a phase difference film and that of a protective film for protecting the cell side of the polarizing sheet. Such phase difference film having the protective function enables decrease of production cost as well as enlargement of viewing angle. Further, the film of the invention can be in a non-self supporting film, and can be in the form of a layer formed by coating a coating solution on a substrate and the like. The uniaxially stretched film of the invention includes not only a precise uniaxial film, but also any film showing essentially uniaxial property having further a biaxial property is imparted. Hence, the film of the invention may be such a film as prepared by laterally uniaxial stretch by means of tentering method and by longitudinally uniaxial stretch utilizing difference between peripheral speed. Such stretch methods include both restricting occurrence of natural shrinkage in a stretching procedure and not restricting the occurrence.

The film of a polymer having a positive intrinsic birefringence employable for the invention is preferably a colorless film having optical transmittance of not less than 70%. Further, the transmittance is more preferably not less than 90%.

The intrinsic birefringence ($\Delta n^\circ$) of the invention means a birefringence when molecules of a polymer are ideally orientated in one direction and is approximately expressed by the following formula:

$$\Delta n^o = \frac{2\pi}{9} \frac{dN}{M} \frac{(n_a^2 + 2)^2}{n_a} \Delta \alpha$$

wherein "$\pi$" represents the ratio of the circumference to its diameter, "d" represents density, "N" represents Avogadro number, "$n_a$" represents average refraction index, and "$\Delta \alpha$" is represented by the following formula:

$$\Delta \alpha = \alpha_1 - \alpha_2$$

wherein "$\alpha_1$" represents the polarizability per monomer constituting a polymer in the direction of molecular axis of the polymer and "$\alpha_2$" represents the polarizability per monomer constituting a polymer in the direction perpendicular to the molecular axis of the polymer.

Examples of the above polymer having a positive intrinsic birefringence include polycarbonate, polyallylate, polyether sulfone, polyphenylene sulfide, polyphenylene oxide, polyallylsulfone, polyamideimide, polyimide, polyolefin, polyvinyl chloride, cellulose and polyester (e.g., polyethylene terephthalate). Particularly, polycarbonate, polyallylate and polyester are preferred because of easiness of formation of a film having uniform surface by means of a solution casting. The above polymer may be a homopolymer, a copolymer, a derivative thereof, or a blended composition comprising two or more kinds of the polymers.

A copolymer having a negative intrinsic birefringence employable for the invention comprises a styrene/acrylonitrile copolymer. The copolymer has a styrene unit and an acrylonitrile unit in the range of 85/15 to 50/50 by weight (former/latter). The phase difference film of the invention is obtained by uniaxially stretching the polymer.

The copolymer having a negative intrinsic birefringence employable for the phase difference film of the invention has either the composition of a) or that of b) as described below.

a) The copolymer consists essentially of the styrene/acrylonitrile copolymer having a styrene unit and an acrylonitrile unit in the range of 85/15 to 50/50 by weight which may contain at least one other unit. Further, the total amount of both the units preferably has not less than 80% by weight based on the whole weight of the polymer, more preferably has not less than 85 weight % and most preferably has not less than 95 weight %.

b) The copolymer consists of both styrene/acrylonitrile copolymer and other polymers, the copolymer having a styrene unit and an acrylonitrile unit in the range of 85/15 to 50/50 by weight. The copolymer more preferably has the styrene/acrylonitrile copolymer of not less than 80 weight %, more preferably has not less than 90 weight %.

The copolymer of the composition b), for example, is a polymer of both styrene/acrylonitrile copolymer (80 wt. %) only consisting of a styrene unit and an acrylonitrile unit and other polymer (20 wt. %) such as acrylic resin.

In the invention, the polymer of a negative intrinsic birefringence preferably consists of the styrene/acrylonitrile copolymer as mentioned above a). Further, it is most preferably that the copolymer consists essentially of styrene unit and acrylonitrile unit. The copolymer has a styrene unit and an acrylonitrile unit in the range of 85/15 to 50/50 by weight, preferably in the range of 75/25 to 60/40 by weight and more preferably in the range of 70/30 to 60/40 by weight. When the amount of a styrene unit is increased, the heat-resistance of the film lowers, and the film becomes less in its birefringence.

The styrene/acrylonitrile copolymer is synthesized from styrene or its derivative and acrylonitrile or its derivative. Examples of the styrene or its derivative include styrene; and styrene derivatives such as $\alpha$-methylstyrene, o-methylstyrene, p-methylstyrene, p-chlorostyrene, p-nitrostyrene, p-aminostyrene, p-carboxyl styrene, p-phenylstyrene and 2,5-dichlorostyrene. Examples of the acrylonitrile or its derivative include acrylonitrile; and acrylonitrile derivatives such as methacrylonitrile and $\alpha$-chloroacrylonitrile. Copolymeryzable monomers can be used in combination with the styrene, acrylonitrile and their derivatives. Examples of the monomers include methyl methacrylate, ethyl methacrylate, methyl acrylate, ethyl acrylate, butyl acrylate, acrylic acid, butadiene, isoprene, maleic anhydride, vinyl acetate, ethylene and propylene. One or more copolymeryzable monomers may be employed.

The weight-average molecular weight of the styrene/acrylonitrile copolymer is in the range of 200,000 to 900,000, preferably is in the range of 250,000 to 800,000, and more preferably is in the range of 350,000 to 700,000. Although the polymerization may be carried out by any conventional method, it is preferably done by an emulsion polymerization method which gives a polymer having a high molecular weight.

The residual monomer (unreacted monomer) in the copolymer is preferably not more than 1.0 weight %, more preferably not more than 0.2 weight %. The polymerization method satisfying the preparation of the above ranges of the molecular weight and the residual monomer, for example, is preferably conducted by the emulsion polymerization method rather than a generally adopted bulk polymerization method or suspension polymerization method. If a large amount of unreacted monomers (including oligomers of low molecular weight) are left in the procedure of the polymerization product, the resultant film lowers in heat-resistance and its birefringence is apt to decrease when the film is kept high temperatures.

Further, the copolymer having a negative intrinsic birefringence of the invention may be a blended composition obtained by mixing the styrene/acrylonitrile copolymer and one or more kinds of polymers as mentioned above (see "b)"). Accordingly, the polymer may contain other polymers in addition to the styrene/acrylonitrile copolymer. Examples of other polymers include polyvinyl chloride, polybutadiene, polyvinylidene fluoride, ABS (Acrylonitrile/Butadiene/Styrene) resin, polyamide (nylon), acrylic resin, polycarbonate, polyallylate, polyolefin (e.g., polyethylene, polypropylene), and polyester (e.g., polyethylene terephthalate). The above polymer may be a homopolymer, a copolymer, a derivative thereof, or a blended composition of two or more kinds of the polymers. The blended polymer preferably has the unit of styrene or its derivative of more than 50 weight % so as not to lower the birefringence.

The phase difference film of the invention made of a uniaxially stretched film of a copolymer having a negative intrinsic birefringence, preferably is a colorless film having optical transmittance of not less than 70%. Further, the transmittance more preferably is not less than 90%. The absolute value of the negative intrinsic birefringence preferably is not less than 0.02, more preferably is not less than 0.04. The use of the copolymer having a negative intrinsic birefringence and the specific composition enables improvement of viewing angle characteristics of the resultant liquid crystal display without excessive increase of thickness and stretch ratio of the film.

The birefringence of the uniaxially stretched film of the styrene/acrylonitrile copolymer is preferred in the range of $1.5 \times 10^{-3}$ to $1.0 \times 10^{-2}$, particularly $2.5 \times 10^{-3}$ to $5.0 \times 10^{-3}$. The thickness of the uniaxially stretched film having the birefringence is preferred in the range of 10 μm to 1 mm. The orientated molecules of the stretched copolymer tend to relax in orientation with rise of temperature in the preparation procedure of a liquid crystal display or during display thereof. To prevent the relaxation, it is preferable that the glass transition temperature (Tg) of the film is not less than 110° C., more preferably not less than 115° C.

Examples of the present invention and comparison examples are given below, but these examples by no means restrict the invention.

EXAMPLE 1

Styrene/acrylonitrile copolymers $a_1$, $a_2$, $a_4$ and $a_5$ were synthesized by a known emulsion polymerization method and then their physical properties were measured. The compositions and the physical properties of the resultant copolymers are shown in Table 1.

The physical properties of the resultant copolymers were measured in the following manner:

1) Weight-average molecular weight

The obtained copolymer was dissolved in tetrahydrofuran (THF) to prepare a solution. The solution was placed on gel permeation chromatography (TOSOH HLC-8020), whereby the weight-average molecular weight of the copolymer was measured.

2) Residual monomer (unreacted monomer)

Unreacted styrene monomer was determined by means of liquid chromatography.

3) Intrinsic birefringence (IB)

The intrinsic birefringence was calculated by the following formula:

$$IB = \frac{(ST-R)/(ST-MW) \times (-0.100)}{(ST-R)/(ST-MW) + (AN-R)/(AN-MW)}$$

wherein "ST-R" represents a ratio of the weight of ST to the total weight of a copolymer of ST and AN (that is "ST/ST+AN"), "ST-MW" represents a molecular weight of ST, "AN-R" represents a ratio of the weight of AN to the total weight of a copolymer of ST and AN (that is "AN/ST+AN"), and "AN-MW" represents a molecular weight of AN.

Each of the obtained styrene/acrylonitrile copolymers was dissolved in methylene chloride to prepare a copolymer solution. The copolymer solution was casted on a stainless belt and the casted layer was dried to form a film having a thickness within the range of 60 μm to 130 μm. In this way, five kinds of films having different thickness were prepared. The obtained films were uniaxially stretched under the stretch conditions set forth in Table 4 to form uniaxially stretched films.

COMPARISON EXAMPLE 1

Styrene/acrylonitrile copolymer $a_3$ was synthesized by a known emulsion polymerization method and then its physical properties was measured. The compositions and the physical properties of the resultant copolymers are shown in Table 1.

The procedure of Example 1 was repeated except for using the above copolymers $a_3$ in place of the styrene/acrylonitrile copolymers to form a uniaxially stretched film.

TABLE 1

| Copolymer No. | $a_1$ | $a_2$ | $a_3$ | $a_4$ | $a_5$ |
| --- | --- | --- | --- | --- | --- |
| *ST/AN by weight | 75/25 | 65/35 | 40/60 | 70/30 | 67/33 |
| ST + AN/whole copolymer (wt. %) | 100 | 100 | 100 | 97 | 87 |
| Additional monomer | none | none | none | Butadiene | Butadiene |
| Weight-average molecular weight ($\times 10^5$) | 4.2 | 3.7 | 2.4 | 5.3 | 6.7 |
| Residual monomer (wt. %) | 0.03 | 0.05 | 0.08 | 0.07 | 0.07 |
| Intrinsic birefringence | −0.060 | −0.049 | −0.025 | −0.054 | −0.051 |

*ST: styrene
AN: acrylonitrile

EXAMPLE 2

Styrene/acrylonitrile copolymers $a_6$, $a_7$ and $a_8$ were synthesized by a suspension polymerization method and then their physical properties were measured in the same manner as described in Example 1. The compositions and physical properties of the resultant copolymers are shown in Table 2.

The procedure of Example 1 was repeated except for using each of the above copolymers $a_6$, $a_7$ and $a_8$ in place of the styrene/acrylonitrile copolymers to form uniaxially stretched films.

TABLE 2

| Copolymer No. | $a_6$ | $a_7$ | $a_8$ |
| --- | --- | --- | --- |
| ST/AN by weight | 65/35 | 65/35 | 69/31 |

TABLE 2-continued

| Copolymer No. | $a_6$ | $a_7$ | $a_8$ |
|---|---|---|---|
| ST + AN/whole copolymer (wt. %) | 100 | 100 | 100 |
| Weight-average molecular weight ($\times 10^5$) | 2.9 | 4.3 | 5.3 |
| Residual monomer (wt. %) | 1.70 | 3.70 | 0.01 |
| Intrinsic birefringence | −0.049 | −0.049 | −0.053 |

EXAMPLE 3

The composition and physical properties of the commercially available styrene/acrylonitrile copolymer $a_9$ synthesized by bulk polymerization method are shown in Table 3. Their physical properties were measured in the same manner as described in Example 1.

The procedure of Example 1 was repeated except for using the above copolymer $a_9$ in place of styrene/acrylonitrile copolymer to form a uniaxially stretched film.

COMPARISON EXAMPLE 2

The compositions and physical properties of commercially available styrene/acrylonitrile copolymers $a_{10}$ to $a_{12}$ and the commercially available polystyrene homopolymer $a_{13}$ synthesized by a bulk polymerization method are shown in Table 3. Their physical properties were measured in the same manner as described in Example 1.

The procedure of Example 1 was repeated except for using each of the above polystyrene homopolymers $a_{10}$ to $a_{13}$ in place of the styrene/acrylonitrile copolymer to form uniaxially stretched films.

TABLE 3

| Copolymer No. | $a_9$ | $a_{10}$ | $a_{11}$ | $a_{12}$ | $a_{13}$ |
|---|---|---|---|---|---|
| ST/AN by weight | 75/25 | 70/30 | 66/34 | 60/40 | 100/0 |
| ST + AN/whole copolymer (wt. %) | 100 | 100 | 100 | 100 | 100 |
| Weight-average molecular weight ($\times 10^5$) | 2.2 | 1.9 | 1.6 | 1.2 | 2.0 |
| Residual monomer (wt. %) | <0.01 | <0.01 | <0.01 | <0.01 | <0.01 |
| Intrinsic birefringence | −0.060 | −0.054 | −0.050 | −0.043 | −0.100 |

The birefringences of the above obtained uniaxially stretched films were measured by means of an ellipsometer "AFP-100" (manufactured by Shimazu Seisakusho Ltd.) using a monochromatic light beam having a wavelength of 632.8 nm. Subsequently, after these stretched films were heated at 90° C. for 4 hours, the birefringences were measured in the same manner as above again, to calculate rate of decrease (%) of birefringences caused by the heat treatment.

The characteristics of the obtained uniaxially stretched films are shown in Table 4.

TABLE 4

| Copolymer No. | Stretching conditions | | Characteristics | |
|---|---|---|---|---|
| | Temp. (°C.) | Percent of stretch (%) | birefringence | lowering rate (%) |
| $a_1$ | 110 | 40 | −3.2 × 10$^{-3}$ | 3.5 |
| $a_2$ | 110 | 40 | −2.7 × 10$^{-3}$ | 1.4 |
| $a_3$ | 105 | 40 | −0.6 × 10$^{-3}$ | 0.9 |
| $a_4$ | 110 | 40 | −3.0 × 10$^{-3}$ | 2.6 |
| $a_5$ | 110 | 40 | −2.4 × 10$^{-3}$ | 3.3 |
| $a_6$ | 105 | 40 | −2.6 × 10$^{-3}$ | 5.2 |
| $a_7$ | 107 | 40 | −1.8 × 10$^{-3}$ | 4.5 |
| $a_8$ | 110 | 40 | −3.4 × 10$^{-3}$ | 2.3 |
| $a_9$ | 105 | 40 | −3.9 × 10$^{-3}$ | 5.3 |
| $a_{10}$ | 105 | 40 | −3.3 × 10$^{-3}$ | 7.2 |
| $a_{11}$ | 107 | 40 | −2.7 × 10$^{-3}$ | 8.8 |
| $a_{12}$ | 105 | 40 | −2.2 × 10$^{-3}$ | 10.6 |
| $a_{13}$ | 100 | 40 | −4.1 × 10$^{-3}$ | 13.5 |

The results of Table 4 teach the following:

1) The larger the ratio of ST/AN, the larger the rate of decrease of the birefringence after heating.

2) When the ratio of ST/AN is not more than 50/50, the film is apt not to play a role as a phase difference film because of a small birefringence.

3) When the residual monomer is more than 1 wt. %, the rate of decrease of the birefringence after heating tends to slightly increase.

4) When the molecular weight becomes smaller, the rate of decrease of the birefringence after heating becomes larger.

Accordingly, it is apparent that the uniaxially stretched film of a styrene/acrylonitrile copolymer having the specific composition of the invention is appropriate for a phase difference film.

EXAMPLE 4

Polycarbonate having a weight-average molecular weight of 100,000 was dissolved in methylene chloride to prepare a solution (concentration: 20 wt. %). The solution was casted on a stainless belt, the casted layer was continuously peeled off and then the peeled layer was dried to form a polycarbonate film. The obtained film was longitudinally and uniaxially stretched in various percents of stretch using rolls having different periphery speeds at 170° C., to prepare four kinds of polycarbonate films $b_1$ to $b_4$.

One of the above polycarbonate films is laminated on one of the styrene/acrylonitrile copolymers obtained in Examples 1 and 2 are in the manner that their stretched axes intersect at right angles. In this way, 4 kinds of phase difference films ($b_1$, $b_2$, $b_3$ and $b_4$) were prepared. The combinations of the styrene/acrylonitrile copolymer film and the polycarbonate film are shown in Table 5.

TABLE 5

| Combination No. | Styrene/acrylonitrile copolymer film | | | Polycarbonate film | | |
|---|---|---|---|---|---|---|
| | No. | birefringence | thickness | No. | birefringence | thickness |
| 1 | $a_1$ | −3.2 × 10$^{-3}$ | 91 μm | $b_1$ | +2.9 × 10$^{-3}$ | 105 μm |
| 2 | $a_2$ | −2.7 × 10$^{-3}$ | 106 μm | $b_2$ | +2.9 × 10$^{-3}$ | 105 μm |
| 3 | $a_5$ | −2.4 × 10$^{-3}$ | 120 μm | $b_3$ | +3.5 × 10$^{-3}$ | 82 μm |
| 4 | $a_8$ | −3.4 × 10$^{-3}$ | 85 μm | $b_4$ | +3.5 × 10$^{-3}$ | 82 μm |

Subsequently, a phase difference film of the personal word-processor "PWP-LQX" (manufactured number; 02G0000515, manufactured by Epson Co., Ltd.) was removed from the word-processor. The laminated films shown in Table 5 were mounted in the word-processor in place of the phase difference film (i.e., mounted between a polarizing sheet and a liquid cell of the word-processor without the phase difference film), in such a manner that the polycarbonate film is arranged on the crystal liquid cell side of the word-processor and its stretched axis is parallel to the longitudinal axis of the display screen of the word-processor. As to the resultant 4 kinds of liquid crystal displays, their display characteristics were evaluated. As a result, all displays showed a distinct black-and-white image and wide viewing angle of not less than 110 degrees in a upward-and-downward direction and not less than 100 degrees in a left-and-light direction.

COMPARISON EXAMPLE 3

In the above personal word-processor "PWP-LQX" where the phase difference film is not removed, its display characteristics were evaluated. As a result, the display showed a black-and-white image but showed narrow viewing angle of 50 degrees in a upward-and-downward direction and 45 degrees in a left-and-light direction.

As is apparent from Example 4 and Comparison example 3, the liquid crystal display of the invention in which the laminated film of the uniaxially stretched film of a styrene/acrylonitrile copolymer having a negative intrinsic birefringence according to the invention and the uniaxially stretched film of a polymer having a positive intrinsic birefringence, is arranged between a polarizing sheet and the liquid crystal cell, shows distinct a black-and-white image and wide viewing angle as well as a excellent heat-resistance that optical characteristics are hardly unchanged to heat treatment at 90° C.

We claims:

1. A liquid crystal display which comprises a liquid crystal cell comprising a pair of substrates provided with a transparent electrode and a twist orientated nematic liquid crystal sealed therebetween, at least one phase difference film provided on at least one of the substrates and a pair of polarizing sheets arranged on the both sides of the cell wherein;

said phase difference film comprises at least one uniaxially stretched film of a polymer having a positive intrinsic birefringence and at least one uniaxially stretched film of a copolymer having a negative intrinsic birefringence, said copolymer comprising a styrene unit and an acrylonitrile unit in the range of 85/15 to 50/50 by weight and having a weight-average molecular weight of 200,000 to 900,000.

2. The liquid crystal display as claimed in claim 1 wherein said copolymer has a weight-average molecular weight of 250,000 to 800,000.

3. The liquid crystal display as claimed in claim 1 wherein said copolymer has a styrene unit and an acrylonitrile unit in the range of 75/25 to 60/40 by weight.

4. The liquid crystal display as claimed in claim 1 wherein the phase difference film is a laminated film comprising a uniaxially stretched film of a polymer having a positive intrinsic birefringence and a uniaxially stretched film of a copolymer having a negative intrinsic birefringence, and the stretched axes of the two films intersect at almost right angles each other.

* * * * *